March 4, 1969  J. WEISHAUPT  3,430,934
PACKING ELEMENT FOR FLUID COLUMNS

Filed May 25, 1967

INVENTOR:
Josef Weishaupt
BY
Karl F. Ross
AGENT

United States Patent Office 3,430,934
Patented Mar. 4, 1969

3,430,934
PACKING ELEMENT FOR FLUID COLUMNS
Josef Weishaupt, Pullach im Isartal, Germany, assignor to Linde Aktiengesellschaft, Hollriegelskreuth, Germany, a corporation of Germany
Continuation-in-part of application Ser. No. 396,484, Sept. 15, 1964. This application May 25, 1967, Ser. No. 641,354
Claims priority, application Germany, Sept. 16, 1963, G 38,699
U.S. Cl. 261—94                 6 Claims
Int. Cl. B01d 47/14

ABSTRACT OF THE DISCLOSURE

Packing element for fluid columns and the like with a thin-walled, preferably tubular body provided on all or most of its surface with an array of perforations of specified dimensions designed to be bridged by membranes of liquid whereby a liquid film covers substantially the entire inner and outer wall surface of the body as in an imperforate element, and two orthogonal arrays of parallel grooves on the external surface of said body.

---

This application is a continuation-in-part of my copending application Ser. No. 396,484 filed Sept. 15, 1964, now abandoned.

My present invention relates to column packing and tower packing for rectification, treatment, fractioning, absorption, separation, washing, liquid-trickle and heat-exchange columns or the like wherein a multiplicity of discrete packing elements are provided in random orientation so that one or more fluids can be passed through the column to contact the individual packing elements thereof; more particularly, the invention relates to packing elements for use in all system which have effectively employed Raschig rings, Pall rings, packing beads or the like, e.g. wherein a gas moves in counterflow to a liquid.

The theory involved in the use of packed columns, containing randomly oriented individual packing elements, for distillation of liquids and the treatment, e.g. washing or chemical reaction (ion exchange), of liquids or gases has developed rapidly over the years and generally involves the consideration that each of the packing elements or rings functions not unlike an individual stage in a multi-stage treatment system. It is thus possible to carry out whatever treatment or enrichment may be required with a high degree of efficiency in spite of the fact that the system has a relatively small volume. In dealing with such columns and the use of column packings, it is desirable to maintain an optimum flow rate of the fluid or fluids and keep pressure losses to a minimum. These parameters and the operating efficiency of the mass of column packing have been found to be, in large measure, determined by the configuration and construction of the individual packing elements employed.

Known packing elements are made from metals, plastics or ceramic materials and are usually of generally cylindrical shape although other configurations, such as saddle shapes (Berl or McMahon rings) or double cones and pyramids (Stedman rings), have also been proposed. Imperforate annular elements, such as Raschig rings, cause a relatively great pressure drop in the stream of treated fluid. To reduce this pressure drop, such rings have also been perforated over all or part of their periphery; the limiting gas velocity (above which particles of counterflowing liquid are entrained by the gas in the opposite direction) is thereby also increased by as much as 30 to 40%. At the same time, however, the effective contact surface available for wetting by the liquid is correspondingly decreased so that the overall figure of merit remains virtually unchanged, unless (as in the Pall ring) tongues stamped out to form the perforations are left partly attached to the ring body and are deflected inwardly toward the axis thereof. Finally, rings and other packing elements have also been constructed from wire mesh, yet their manufacture in this case is relatively complicated and their resistance to deformation is low so that the height of columns or beds formed from them must be limited; because they are also relatively expensive and difficult to manufacture, their use has been confined almost exclusively to laboratory work, systems requiring high purity and processes in which the products have considerable economic value. These rings are particularly effective, as a consequence of their high operating efficiency, for use in isotope-separation systems.

The general object of my present invention is to provide an improved packing element combining the advantages and avoiding the drawbacks of the various types of elements described above.

A more particular object of this invention is to provide a packing element which can be mass-produced by simple means and affords a multiplicity of flow paths, like conventional perforated mesh-type elements, while exhibiting a large effective liquid-supporting surface comparable to that of Raschig rings and other solid packing elements.

I have found, in accordance with the instant invention, that the foregoing objects can be realized in an otherwise conventional packing element, i.e. a ring or other thin-walled body curved in at least one plane, by the provision of an array of perforations distributed substantially uniformly over the entire surface of the body or over at least a major part thereof, the cross-sectional area of each perforation ranging from a fraction of a square millimeter (minimum 0.2 mm.$^2$) to about 6 mm.$^2$ while the total perforated area should range between approximately 30% and 60% of the entire body surface. The lower limit (30%) for the collective area of the perforations is determined by the need for an effective interchange of fluids on both sides of the body wall; its upper limit (60%) stems from considerations of structural stability, to prevent crushing of the body by an overlying pile of similar elements even if its wall thickness is only a fraction of a millimeter. Moreover, the width of each perforation at least in the direction of surface curvature (i.e. as measured in a radial plane in the case of a cylindrical body) should be not greater than substantially 2 mm. but preferably not less than the wall thickness of the body; for circular openings this corresponds to a maximum cross-sectional area of slightly above 3 mm.$^2$. For best results, the cross-sectional area should range between about 0.5 and 2 mm.$^2$, with a maximum radial-plane width of about 1 mm.

Surprisingly, a thin-walled body so perforated acts, in a liquid environment, almost like a solid body in that the liquid (whether aqueous or organic, e.g. acetone) will form a substantially continuous layer on both wall surfaces thereof, spanning the openings even when their area is horizontal. Unlike solid bodies, however, the liquid membranes extending across the perforations are permeable to gases and also permit an interchange of liquids from opposite sides of the body wall in both directions. If, on the other hand, the dimensions of the perforations substantially exceed the upper limits given above, the film becomes excessively permeable to liquids gravitating from the upper to the lower film surface (if the axis of the body is horizontal or only slightly inclined) so that the upper peripheral surface portions of the packing element tend to run dry as the liquid thereat passes downwardly through the holes. This relationship applies to a variety of aperture shapes (e.g. circular, oval, rectangular or rhombic) and is independent of the overall size of the body.

While, in most instances, it is desirable that the perforations be stamped from the walls of the elements and the latter subsequently rolled, it is also possible to form approximately diamond-shaped apertures by conventional expanded-metal techniques whereby a strip of metal is incised at staggered locations in a plurality of parallel rows and the metal is then stretched in a direction perpendicular to the incisions; this, however, leads to the formation of jagged edges which, in order to prevent entanglement between adjoining elements, I prefer to avoid by leaving an imperforate marginal zone along each edge. It is also possible to create the apertures by incorporating in the wall of the element a corresponding pattern of chemically removable particles which, after formation of the element, are eliminated by dissolution, melting out, volatilization or combustion. Thus, a body of porcelain or refractory composition may have dispersed therein (preferably in a regular manner) a multiplicity of soluble inserts (e.g. elongated metal granules) of the requisite dimensions. Since the metal granules will be exposed after formation of the packing elements, the latter can be treated with an acid in which the metal is soluble to leave apertures whose configurations are those of the individual inserts. It is also possible to substitute combustible particles (e.g. carbon) for the metal granules in which case the porcelain can be fired and the carbon burned out to leave the apertures.

Preferably, in the case of a cylindrical body, the apertures are disposed in angularly spaced axially extending rows, with relative staggering of the apertures of adjacent rows. To insure maximum uniformity of the liquid film, the midpoints of any two adjacent apertures in a single row and in two adjoining rows should have the same spacing. Particularly advantageous results are obtained when the element is composed of a synthetic-resin foil perferably reinforced with fibrous material. Thus, glass-fiber-reinforced epoxy-resin sheets or strips are especially satisfactory.

Yet a further feature of the present invention resides in the provision of an array of generally parallel grooves in at least the external surface of the body although the internal surface can be provided with similar grooves as will be evident hereinafter. The grooves should have a depth, width and spacing ranging between substantially 0.1 and 0.4 mm. and preferably from 0.2 to 0.3 mm. The grooves can be applied by rolling, using any conventional technique, although it is noted that the effect of grooving can be improved even further by having the grooves constituted in two orthogonal arrays as produced by knurling. The rolled and grooved body can be constructed from sheet metal or a synthetic-resin foil (e.g. the fiber-reinforced foil mentioned above). Unlike conventional packing elements, this arrangement insures a uniform distribution of the film over the surfaces of the body and prevents accumulation of liquid on one or another portion thereof. Thus, no barriers develop to the passage of liquid or gases through the mass and a maximum surface contact is obtained because of the uniform film thickness.

The above and other objects, features and advantages of the present invention will become more readily apparent from the following description, reference being made to the accompanying drawing in which.

Figure 1:
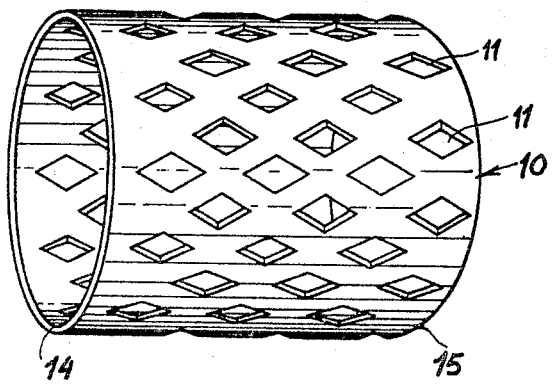
FIG. 1 is a perspective view of a packing element, embodying the present invention, provided with diamond-shaped or rhombic apertures.
Figure 2:
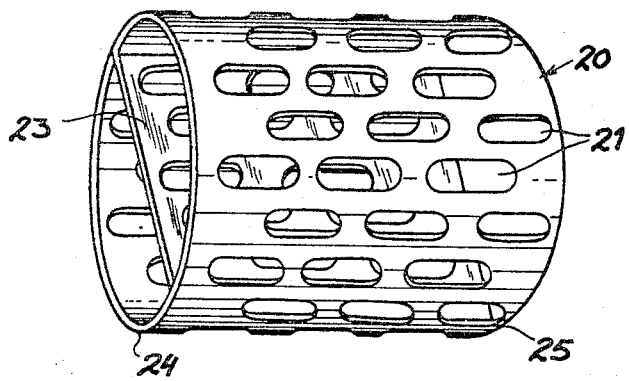
FIG. 2 is a similar view of a packing element having elongated apertures.
Figure 3:
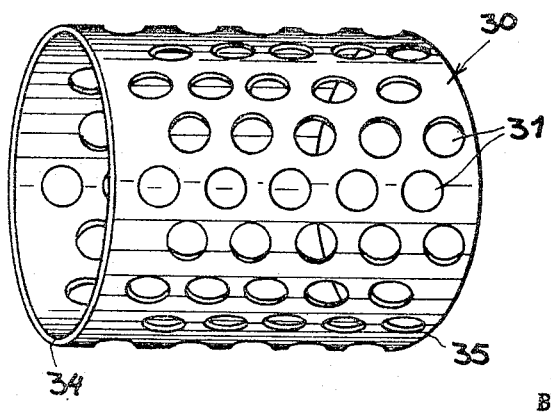
FIG. 3 is another perspective view of a packing element provided with circular openings.

In FIG. 1, I show a tubular metallic packing element 10 which can be formed by conventional expanded-metal techniques and is provided over its entire surface with an array of diamond-shaped apertures 11 whose midpoints are equidistant, i.e. lie at the vertices of equilateral triangles. The width of each aperture 11 in peripheral direction is at most equal to 2 mm. and its cross-sectional area is not greater than 6 mm.$^2$. In the packing element 20 of FIG. 2, the elongated apertures 21 extend parallel to the cylinder axis and also have midpoints which lie approximately at the vertices of equilateral triangles. A central web 23 of the same wall thickness (e.g. 1 mm.), lying in an axial plane of the cylindrical body 20 integral therewith, is apertured in a similar manner. The packing element 30 of FIG. 3 is provided with circular apertures 31, of maximum radius of 1 mm., again having centers lying at the vertices of an equilateral triangle. In each of these cases, the opposite longitudinal edges (14, 15; 24, 25; 34, 35) are smooth to insure a uniform passage of liquid over these edges.

Figure 4:
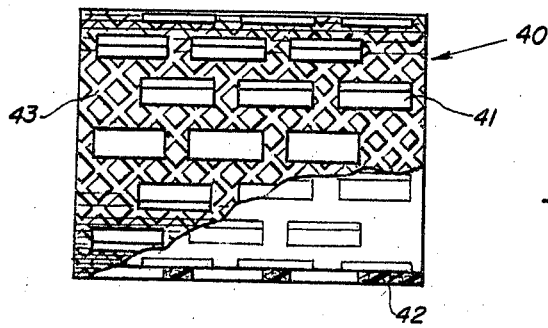
FIG. 4 is an elevational view, partly broken away, of yet another packing element.
Figure 5:
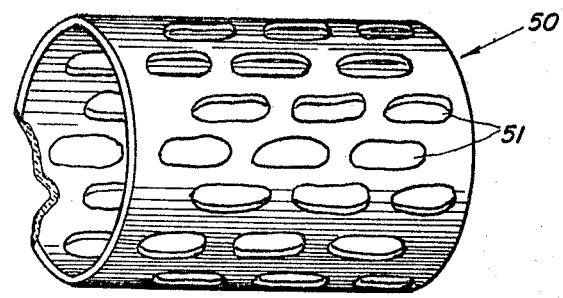
FIG. 5 is a view similar to FIGS. 1 to 3 of a packing element formed by removal of particles from the wall of the body.
Figure 6:
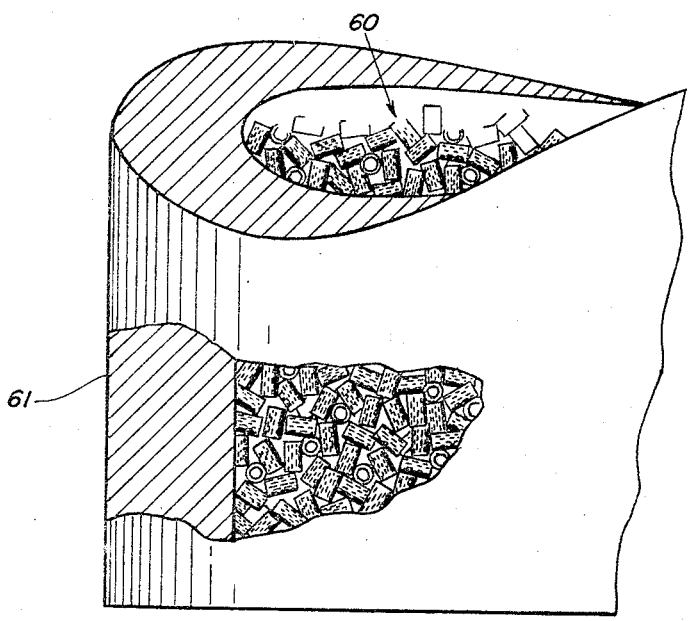
FIG. 6 is a fragmentary vertical cross-sectional view of a packing column according to the invention.

The packing element 40 of FIG. 4 is provided with an array of rectangular apertures 41 whose orientation is similar to that described with reference to FIG. 2. This element is composed of a synthetic-resin foil with imbedded glass fibers 42 and is provided at least along its outer surface and preferably on both inner and outer surfaces with orthogonally intersecting arrays of grooves 43. The latter prevent the development of barriers to the flow of liquid or gas when the rings are poured in random fashion into a column 61 as indicated at 60 in FIG. 6. The grooves have a depth, width and separation between 0.2 and 0.3 mm. In the system of FIG. 5, the somewhat irregular openings 51 of porcelain element 50 are formed by chemical removal of grains of a combustible or soluble material as indicated above.

In each of the embodiments illustrated in the drawing, the number of apertures is so chosen that their combined area lies between about 30% and 60% of the cylinder surface of the respective element. The same relationship is to be maintained when packing elements of other than cylindrical configuration are to be provided with perforations conforming to the teachings of my invention.

I claim:

1. A packing element for fluid columns and the like, comprising a thin-walled sheet-metal body of substantially cylindrical shape, said body being provided with an array of perforations distributed in a multiplicity of axially extending rows over at least the major part of its surface, the combined area of said perforations ranging between substantially 30% and 60% of said surface, each perforation having a cross-sectional area between substantially 0.2 and 6 mm.$^2$, said perforations having their inner and outer edges flush with the inner and outer peripheral surfaces of said body, the external surface of said body being formed with two orthogonal arrays of parallel grooves.

2. A packing element as defined in claim 1 wherein said perforation has a width in the plane of curvature up to substantially 2 mm.

3. A packing element as defined in claim 2 wherein the wall thickness of said body is less than said width.

4. A packing element as defined in claim 1 wherein the perforations of adjoining rows are axially staggered.

5. A packing element as defined in claim 4 wherein the center spacing of any two adjoining perforations in a single row and in adjacent rows is the same.

6. A packing element as defined in claim 1 wherein said grooves have a depth and a width ranging between substantially 0.1 and 0.4 mm.

(References on following page)

References Cited

UNITED STATES PATENTS

| | | | |
|---|---|---|---|
| 2,594,585 | 4/1952 | Ridgway | 261—95 |
| 2,602,651 | 7/1952 | Cannon | 261—95 |
| 2,615,832 | 10/1952 | Dixon | 261—95 X |
| 3,084,918 | 4/1963 | Kohl et al. | |
| 3,151,187 | 9/1964 | Comte | 261—94 |
| 3,266,787 | 8/1966 | Eckert | 261—94 |

FOREIGN PATENTS

| | | |
|---|---|---|
| 526,609 | 9/1940 | Great Britain. |

OTHER REFERENCES

Raschig: German application No. 1,051,814, published Mar. 5, 1959, 261–94.

Weishaupt: German application No. 1,115,278, published Oct. 19, 1961, 261–94.

HARRY B. THORNTON, *Primary Examiner*.

TIM R. MILES, *Assistant Examiner*.